(12) United States Patent
Burdis et al.

(10) Patent No.: US 8,730,552 B2
(45) Date of Patent: May 20, 2014

(54) ELECTROCHROMIC DEVICES HAVING IMPROVED ION CONDUCTING LAYERS (75) Inventors: Mark Samuel Burdis, Faribault, MN (US); Bryan D. Greer, Northfield, MN (US); Douglas Glenn John Weir, Northfield, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 176 days.

(21) Appl. No.: 13/029,515

(22) Filed: Feb. 17, 2011

(65) Prior Publication Data

US 2011/0135837 A1 Jun. 9, 2011

Related U.S. Application Data (60) Continuation of application No. 12/460,145, filed on Jul. 14, 2009, now Pat. No. 8,004,744, which is a division of application No. 11/545,639, filed on Oct. 10, 2006, now Pat. No. 7,593,154.

(60) Provisional application No. 60/725,581, filed on Oct. 11, 2005.

(51) Int. Cl.
*G02F 1/15* (2006.01)
(52) U.S. Cl.
USPC .......................................................... 359/265
(58) Field of Classification Search
USPC ................... 359/265–275, 900; 345/105, 107
See application file for complete search history.

(56) References Cited

U.S. PATENT DOCUMENTS

| | | |
|---|---|---|
| 4,281,208 A | 7/1981 | Kuwano et al. |
| 4,293,194 A | 10/1981 | Takahashi et al. |
| 4,652,090 A | 3/1987 | Uchikawa et al. |
| 4,719,501 A | 1/1988 | Nakagawa et al. |
| 4,824,221 A | 4/1989 | Endo et al. |
| 4,832,463 A | 5/1989 | Goldner et al. |
| 4,867,541 A | 9/1989 | Hotomi et al. |

(Continued)

FOREIGN PATENT DOCUMENTS

| | | |
|---|---|---|
| EP | 0730189 | 9/1996 |
| EP | 1369740 | 12/2003 |

(Continued)

OTHER PUBLICATIONS

West, "Chapter 7: Electrical Properties", Basic Solid State Chemistry, 2nd Ed. Wiley 1999), p. 318-320.

(Continued)

*Primary Examiner* — Tuyen Tra
(74) *Attorney, Agent, or Firm* — Lerner, David, Littenberg, Krumholz & Mentlik, LLP (57) ABSTRACT An improved ion conductor layer for use in electrochromic devices and other applications is disclosed. The improved ion-conductor layer is comprised of at least two ion transport layers and a buffer layer, wherein the at least two ion transport layers and the buffer layer alternate within the ion conductor layer such that the ion transport layers are in communication with a first and a second electrode. Electrochromic devices utilizing such an improved ion conductor layer color more deeply by virtue of the increased voltage developed across the ion conductor layer prior to electronic breakdown while reducing the amount of electronic leakage. Also disclosed are methods of making electrochromic devices incorporating the improved ion conductor layer disclosed herein and methods of making ion conductors for use in other applications.

16 Claims, 2 Drawing Sheets

(56) References Cited

U.S. PATENT DOCUMENTS

| | | | |
|---|---|---|---|
| 4,876,628 A | 10/1989 | Goldner et al. |
| 4,878,993 A | 11/1989 | Rossi et al. |
| 4,889,414 A | 12/1989 | Rauh et al. |
| 4,938,571 A | 7/1990 | Cogan et al. |
| 4,960,324 A | 10/1990 | Brown |
| 5,019,420 A | 5/1991 | Rauh |
| 5,051,274 A | 9/1991 | Goldner et al. |
| 5,069,535 A | 12/1991 | Baucke et al. |
| 5,080,471 A | 1/1992 | Cogan et al. |
| 5,084,777 A | 1/1992 | Slobodin |
| 5,133,594 A | 7/1992 | Haas et al. |
| 5,151,224 A | 9/1992 | Madou et al. |
| 5,171,413 A | 12/1992 | Arntz et al. |
| 5,189,550 A | 2/1993 | Goldner et al. |
| RE34,469 E | 12/1993 | Cogan et al. |
| 5,288,433 A | 2/1994 | Stevens et al. |
| 5,307,201 A | 4/1994 | Passerini et al. |
| 5,321,544 A | 6/1994 | Parkhe et al. |
| 5,327,281 A | 7/1994 | Cogan et al. |
| 5,372,992 A * | 12/1994 | Itozaki et al. ................ 505/238 |
| 5,404,244 A | 4/1995 | Van Dine et al. |
| 5,497,306 A | 3/1996 | Pastrick |
| 5,532,869 A | 7/1996 | Goldner et al. |
| 5,659,417 A | 8/1997 | Van Dine et al. |
| 5,668,663 A | 9/1997 | Varaprasad et al. |
| 5,669,699 A | 9/1997 | Pastrick et al. |
| 5,669,704 A | 9/1997 | Pastrick |
| 5,671,996 A | 9/1997 | Bos et al. |
| 5,684,619 A | 11/1997 | Shabrang et al. |
| 5,699,192 A | 12/1997 | Van Dine et al. |
| 5,724,177 A | 3/1998 | Ellis, Jr. et al. |
| 5,757,537 A | 5/1998 | Ellis, Jr. et al. |
| 5,768,004 A | 6/1998 | Cogan |
| 5,793,518 A | 8/1998 | Lefrou et al. |
| 5,823,654 A | 10/1998 | Pastrick et al. |
| 5,831,760 A | 11/1998 | Hashimoto et al. |
| 5,879,074 A | 3/1999 | Pastrick |
| 5,938,321 A | 8/1999 | Bos et al. |
| 5,985,486 A | 11/1999 | Giron et al. |
| 6,063,718 A | 5/2000 | El Khiati et al. |
| 6,086,229 A | 7/2000 | Pastrick |
| 6,087,953 A | 7/2000 | DeLine et al. |
| 6,094,292 A | 7/2000 | Goldner et al. |
| 6,139,172 A | 10/2000 | Bos et al. |
| 6,149,287 A | 11/2000 | Pastrick et al. |
| 6,172,613 B1 | 1/2001 | DeLine et al. |
| 6,178,034 B1 | 1/2001 | Allemand et al. |
| 6,211,995 B1 | 4/2001 | Azens et al. |
| 6,222,460 B1 | 4/2001 | DeLine et al. |
| 6,266,177 B1 | 7/2001 | Allemand et al. |
| 6,277,523 B1 | 8/2001 | Giron et al. |
| 6,296,379 B1 | 10/2001 | Pastrick |
| 6,299,333 B1 | 10/2001 | Pastrick et al. |
| 6,326,900 B2 | 12/2001 | DeLine et al. |
| 6,366,213 B2 | 4/2002 | DeLine et al. |
| 6,412,973 B1 | 7/2002 | Bos et al. |
| 6,420,071 B1 | 7/2002 | Lee et al. |
| 6,437,901 B1 | 8/2002 | Kobayashi et al. |
| 6,444,189 B1 | 9/2002 | Wang et al. |
| 6,464,692 B1 | 10/2002 | Ruiz et al. |
| 6,483,438 B1 | 11/2002 | DeLine et al. |
| 6,494,602 B2 | 12/2002 | Pastrick et al. |
| 6,498,358 B1 | 12/2002 | Lach et al. |
| 6,529,308 B2 | 3/2003 | Beteille et al. |
| 6,587,250 B2 | 7/2003 | Armgarth et al. |
| 6,630,566 B1 | 10/2003 | Allen et al. |
| 6,635,914 B2 | 10/2003 | Kozicki et al. |
| 6,642,851 B2 | 11/2003 | Deline et al. |
| 6,685,348 B2 | 2/2004 | Pastrick et al. |
| 6,795,226 B2 | 9/2004 | Agrawal et al. |
| 6,906,842 B2 * | 6/2005 | Agrawal et al. ................ 359/265 |
| 6,940,628 B2 | 9/2005 | Giron et al. |
| 6,952,299 B1 | 10/2005 | Fukazawa et al. |
| 7,042,615 B2 | 5/2006 | Richardson |
| 2009/0131238 A1 | 5/2009 | Kishimoto et al. |
| 2010/0084016 A1 | 4/2010 | Aitken et al. |
| 2010/0245973 A1 | 9/2010 | Wang et al. |
| 2010/0300535 A1 | 12/2010 | Aitken et al. |
| 2010/0300536 A1 | 12/2010 | Aitken et al. |
| 2011/0017297 A1 | 1/2011 | Aitken et al. |
| 2011/0043887 A1 | 2/2011 | Valentin et al. |
| 2011/0051221 A1 | 3/2011 | Veerasamy |

FOREIGN PATENT DOCUMENTS

| | | |
|---|---|---|
| JP | 61086734 A | 5/1986 |
| JP | 11310432 A | 11/1999 |
| JP | 2004171008 A | 6/2004 |
| JP | 2007284307 A | 11/2007 |
| JP | 2008280189 A | 11/2008 |
| JP | 2009120407 A | 6/2009 |
| JP | 2009215165 A | 9/2009 |
| KR | 1020100080436 | 7/2010 |
| WO | 9415247 | 7/1994 |
| WO | 2010042460 A2 | 4/2010 |

OTHER PUBLICATIONS

C.G . Granvist, Handbook of Inorganic Electrochromic Materials, 1995: Elsevier.

Database WPI Week 200938 Thomson Scientific. London. GB; AN 2009-J89678 XP002571145, Abstract.

International Search Report for Application No. PCT/FR2010/051543 dated Jun. 14, 2011.

Kasturi L. Chopra, Thin Film Phenomena, McGraw Hill : 1969, pp. 479.

Written Opinion for Application No. PCT/FR2010/051543 dated Jun. 14, 2011.

* cited by examiner

ELECTROCHROMIC DEVICES HAVING IMPROVED ION CONDUCTING LAYERS

CROSS-REFERENCE TO RELATED APPLICATIONS

This application is a continuation of U.S. application Ser. No. 12/460,145, filed on Jul. 14, 2009, which is a divisional of U.S. application Ser. No. 11/545,639, filed on Oct. 10, 2006, and claims the benefit of the filing date of U.S. Provisional Patent Application No. 60/725,581 filed Oct. 11, 2005, the disclosures of which are incorporated herein by reference.

BACKGROUND OF THE INVENTION

The present invention relates to electrochromic devices and more particularly relates to solid-state, inorganic thin film electrochromic devices.

Electrochromic materials and devices have been developed as an alternative to passive coating materials for light and heat management in building and vehicle windows. In contrast to passive coating materials, electrochromic devices employ materials capable of reversibly altering their optical properties following electrochemical oxidation and reduction in response to an applied potential. The optical modulation is the result of the simultaneous insertion and extraction of electrons and charge compensating ions in the electrochemical material lattice.

Figure 1:
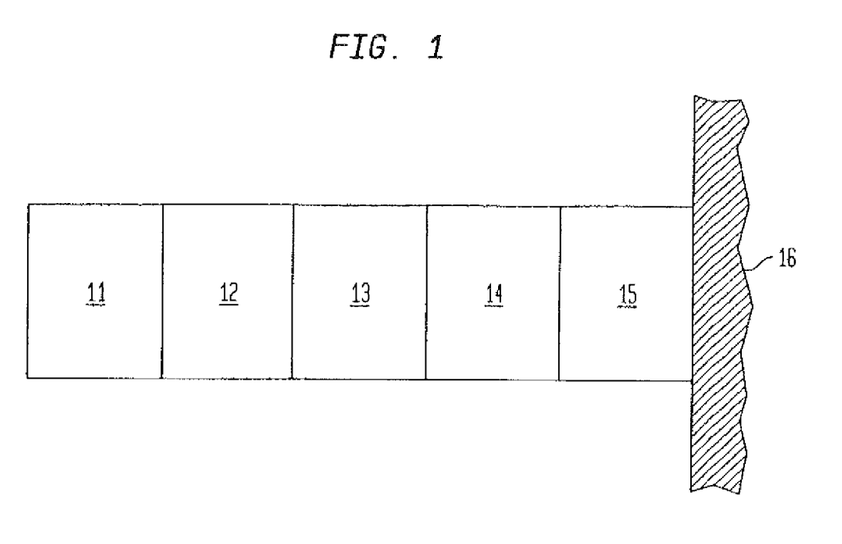
FIG. 1 is a schematic cross-section of a typical five layer electrochromic device.

In general, electrochromic devices have a composite structure through which the transmittance of light can be modulated. FIG. 1 illustrates a typical five layer solid-state electrochromic device in cross-section having the five following superimposed layers: an electrochromic electrode layer ("EC") 14 which produces a change in absorption or reflection upon oxidation or reduction; an ion conductor layer ("IC") 13 which functionally replaces an electrolyte, allowing the passage of ions while blocking electronic current; a counter electrode layer ("CE") 12 which serves as a storage layer for ions when the device is in the bleached or clear state; and two conductive layers ("CL") 11 and 15 which serve to apply an electrical potential to the electrochromic device. Each of the aforementioned layers are typically applied sequentially on a substrate 16. Such devices typically suffer from electronic leakage and electronic breakdown.

In order for a solid state electrochromic device to function correctly, it is necessary to incorporate an ion conductor layer which effectively blocks electronic current while admitting the passage of ions (typically protons ($H^+$) or lithium ions ($Li^+$)) at a reasonable rate. However, any electronic current that leaks or passes through the ion conductor layer serves to short out the required voltage and inhibits the flow of ions. As such, electronic leakage current leads to compromises in device performance including a lowered dynamic range, non-uniform coloration, decreased ionic conductance, slower switching rates, and increased power consumption. Merely increasing the thickness of the ion conductor layer may result in a reduction of leakage current, but at the expense of degraded optical properties, increased layer deposition time and cost, and reduced switching rates. Accordingly, it is desirable to reduce the amount of electronic leakage through an electrochromic device without resorting to a thick ion conductor layer so as to avoid these compromises in performance.

Figure 2:
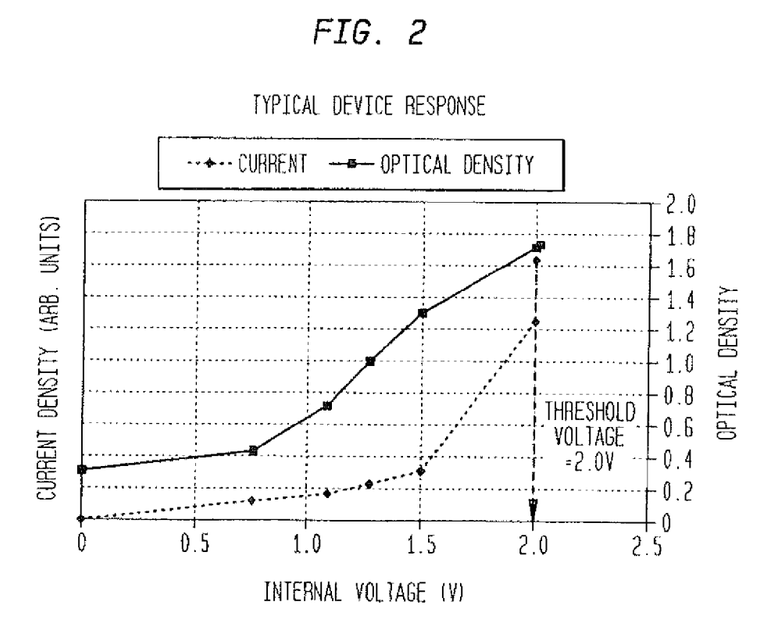
FIG. 2 is a graph of internal voltage versus current and optical density for a typical large area electrochromic device.

Moreover, solid state electrochromic devices are also subject to "electronic breakdown." FIG. 2 shows the equilibrium electrical and optical characteristics of an electrochromic device for applied voltages in the 'forward' or coloring polarity, up until the point where substantial electronic leakage current begins to flow. These characteristics are plotted as a function of the internal voltage, which is the voltage applied to the device minus the voltage induced in the series resistance as a result of the current flowing. Initially, there is a slow increase in the current density below a particular 'threshold voltage,' accompanied by an increase in optical density. Above the threshold voltage, however, the electrochromic device breaks down electronically and any additional current flowing is primarily electronic leakage. Moreover, reaching the threshold voltage prevents any further increases in voltage across the electrochromic device. Since the coloration of a device is related to the voltage that can be developed across the electrochromic device, the threshold voltage will determine the maximum obtainable optical density for a given device structure, i.e. a particular layer thickness, and, hence its dynamic range. As such, it is desirable to increase the voltage that can be developed across the ion conductor layer of the electrochromic device prior to it breaking down so as to allow electrochromic devices to color more deeply and to reduce power consumption.

Takahashi (U.S. Pat. No. 4,293,194) discloses a device having decreased electronic leakage. Takahashi teaches a solid electrochromic device incorporating an electron blocking material comprised of a layer of an N-type semiconductor adjacent to a layer of a P-type semiconductor. However, Takahashi does not teach a multi-layered thin film ion conductor layer capable of reducing electronic leakage while increasing the voltage that may be developed across the ion conductor layer.

SUMMARY OF THE INVENTION

In accordance with the present invention, an electrochromic device has been discovered comprising a first electrode comprising one of an electrochromic electrode layer and a counter electrode layer, a second electrode comprising the other of said electrochromic electrode layer and said counter electrode layer, an ion-conductor layer for conducting ions between the first and second electrodes comprising at least two ion transport layers and a buffer layer, the at least two ion transport layers and the buffer layer alternating within the ion conductor layer such that the ion transport layers are in communication with the first and second electrodes, a first conductive layer, and a second conductive layer, wherein the first and second electrodes and the ion-conductor layer are sandwiched between the first and second conductive layers.

In accordance with one embodiment of the present invention, adjacent ones of the at least two ion transport layers and buffer layer are comprised of different materials.

In accordance with another embodiment of the present invention, the at least two ion transport layers are comprised of an insulator. In some embodiments, the insulator is comprised of a material selected from the group consisting of silicon oxides, aluminum oxides, aluminum nitrides, niobium oxides, tantalum oxides, zirconium oxides, yttrium oxides, hafnium oxides, and mixtures thereof. In other embodiments, the insulator is comprised of a material selected from the group consisting of $SiO_2$, $Al_2O_3$, $Nb_2O_3$, $Ta_2O_5$, $LiTaO_3$, $LiNbO_3$, $La_2TiO_7$, $La_2TiO_7$, $SrZrO_3$, $ZrO_2$, $Y_2O_3$, $Nb_2O_5$, $La_2Ti_2O_7$, $LaTiO_3$, $HfO_2$, and mixtures thereof.

In accordance with another embodiment of the present invention, the insulator is a mixture of a silicon oxide and an aluminum oxide, wherein an amount of the silicon oxide to an amount of the aluminum oxide ranges from about 25:1 to about 1:25, preferably ranging from about 11:1 to about 17:1.

In accordance with another embodiment of the present invention, the insulator is a mixture of a zirconium oxide and a yttrium oxide, wherein an amount of the zirconium oxide to an amount of the yttrium oxide ranges from about 25:1 to about 1:25.

In accordance with another embodiment of the present invention, the at least two ion transport layers have a thickness ranging from about 1 nm to about 70 nm, preferably from about 5 nm to about 30 nm.

In accordance with another embodiment of the present invention, the material comprising the buffer layer is selected from the group consisting of transparent lithium ion permeable materials and mixed conductors. In some embodiments of the present invention, the material comprising the buffer layer is selected from the group consisting of tungsten oxides, nickel oxides, cerium oxides, molybdenum oxides, vanadium oxides, and mixtures thereof. In other embodiments of the present invention, the buffer layer is comprised of a material selected from the group consisting of $WO_3$, NiO, $CeO_2$, $MoO_3$, $V_2O_5$, and mixtures thereof. In yet other embodiments, the buffer layer is comprised of a lithium-based ceramic material including lithium silicates, lithium aluminum silicates, lithium aluminum borates, lithium borates, lithium silicon oxynitrides, lithium zirconium silicates, lithium niobates, lithium borosilicates, lithium phosphosilicates, lithium nitrides, lithium aluminum fluoride, and mixtures thereof.

In accordance with another embodiment of the present invention, the buffer layer has a thickness ranging from about 10 nm to about 300 nm, preferably from about 30 nm to about 150 nm.

In accordance with another embodiment of the present invention, the electrochromic electrode layer is comprised of a material selected from the group consisting of metal oxides and mixed metal oxides including tungsten oxides, vanadium oxides, molybdenum oxides, niobium oxides, titanium oxides, copper oxides, iridium oxides, chromium oxides, cobalt oxides, manganese oxides, and mixtures thereof.

In accordance with another embodiment of the present invention, the counter electrode layer is comprised of a material selected from the group consisting of metal oxides and mixed metal oxides including vanadium oxides, niobium oxides, nickel oxides, nickel hydroxides, iridium oxides, copper oxides, tungsten oxides, molybdenum oxides, and mixtures thereof. In some embodiments, the mixed metal oxides comprise a first transition metal oxide present as a stable metal oxide matrix and a second transition metal doped into the stable metal oxide matrix. In preferred embodiments, the first transition metal oxide is selected from the group consisting of chromium, tungsten, and tantalum, and the second transition metal oxide is selected from the group consisting of vanadium and nickel.

In accordance with another embodiment of the present invention, the first and second conductive layers are comprised of a material selected from the group consisting of metal oxides and transparent coatings of transition metals.

In accordance with another embodiment of the present invention, the electrochromic device is disposed on a substrate selected from the group consisting of glass and plastic.

In accordance with another objective of the present invention, an ion conductor layer for transporting ions between a first electrode and a second electrode comprising at least two ion transport layers and a buffer layer has been discovered, wherein the at least two ion transport layers and the buffer layers alternate within the ion conductor layer such that the ion transport layers are in communication with the first and second electrodes.

In accordance with one embodiment of the present invention, adjacent ones of the at least two ion transport layers and buffer layer are comprised of different materials.

In accordance with another embodiment of the present invention, the at least two ion transport layers are comprised of an insulator including silicon oxides, aluminum oxides, aluminum nitrides, niobium oxides, tantalum oxides, zirconium oxides, yttrium oxides, hafnium oxides, and mixtures thereof.

In accordance with another embodiment of the present invention, the buffer layer is selected from the group consisting of transparent lithium ion permeable materials and mixed conductors. In some embodiments of the present invention, the buffer layer is selected from the group consisting of tungsten oxides, nickel oxides, cerium oxides, molybdenum oxides, vanadium oxides, and mixtures thereof. In other embodiments, the buffer layer is comprised of lithium-based ceramic materials.

In accordance with the present invention, a method for the preparation of an electrochromic device has been discovered comprising the following steps: a) providing a first conductive layer, b) depositing one of an electrochromic electrode layer and a counter electrode layer on the first conductive layer, thereby providing a first deposited electrode, c) depositing an ion-conductor layer on the first deposited electrode, the ion-conductor layer comprising at least two ion transport layers and a buffer layer, wherein the at least two ion transport layers and the buffer layer are sequentially applied such that one of the at least two ion transport layers is in communication with the first deposited electrode, d) depositing the other of the electrochromic electrode layer and the counter electrode layer on the ion-conductor layer, thereby providing a second deposited electrode in communication with the other of the at least two ion transport layers, and e) depositing a second conductive layer on the second deposited electrode.

In accordance with another embodiment of the method of the present invention, the method includes subsequently subjecting at least one of the first and second deposited electrodes to a heat treatment step, whereby the heat treatment step may be in a vacuum, an inert atmosphere, or an atmospheric oven. The heat treatment step may be performed at a temperature ranging from about 40° C. to about 550° C., preferably ranging from about 200° C. to about 500° C.

In accordance with another embodiment of the method of the present invention, the method comprises independently depositing the first and/or second electrodes by means of a method selected from the group consisting of physical vapor deposition, intermediate frequency reactive sputtering, DC sputtering, and wet chemical methods.

In accordance with another embodiment of the method of the present invention, the method includes reducing at least one of the first and second deposited electrodes by inserting ions thereinto. In some embodiments, the reducing step is effected during the depositing of the first and second electrodes. The inserted ions may be selected from the group consisting of lithium ions, sodium ions, and protons.

In accordance with another embodiment of the method of the present invention, the method comprises independently depositing the ion transport layers by means of a method selected from the group consisting of physical vapor deposition, intermediate frequency reactive sputtering, DC sputtering, wet chemical methods, laser ablation methods, sol-gel, metallo-organic decomposition, and magnetic sputtering.

In accordance with another embodiment of the method of the present invention, the method comprises depositing the buffer layer by means of a method selected from the group consisting of physical vapor deposition, intermediate frequency reactive sputtering, DC sputtering, wet chemical methods, laser ablation methods, sol-gel, metallo-organic decomposition, and magnetic sputtering.

In accordance with another embodiment of the method of the present invention, adjacent ones of the at least two ion transport layers and buffer layer are comprised of different materials.

In accordance with another embodiment of the method of the present invention, the at least two ion transport layers are comprised of an insulator. In some embodiments, the insulator is comprised of a material selected from the group consisting of silicon oxides, aluminum oxides, aluminum nitrides, niobium oxides, tantalum oxides, zirconium oxides, yttrium oxides, hafnium oxides, and mixtures thereof. In other embodiments, the insulator is comprised of a material selected from the group consisting of $SiO_2$, $Al_2O_3$, $Nb_2O_3$, $Ta_2O_5$, $LiTaO_3$, $LiNbO_3$, $La_2TiO_7$, $La_2TiO_7$, $SrZrO_3$, $ZrO_2$, $Y_2O_3$, $Nb_2O_5$, $La_2Ti_2O_7$, $LaTiO_3$, $HfO_2$, and mixtures thereof.

In accordance with another embodiment of the method of the present invention, the material comprising the buffer layer is selected from the group consisting of transparent lithium ion permeable materials and mixed conductors. In some embodiments of the present invention, the material comprising the buffer layer is selected from the group consisting of tungsten oxides, nickel oxides, cerium oxides, molybdenum oxides, vanadium oxides, and mixtures thereof. In other embodiments of the present invention, the buffer layer is comprised of a material selected from the group consisting of $WO_3$, NiO, $CeO_2$, $MoO_3$, $V_2O_5$, and mixtures thereof. In yet other embodiments, the buffer layer is comprised of a lithium-based ceramic material including lithium silicates, lithium aluminum silicates, lithium aluminum borates, lithium borates, lithium silicon oxynitrides, lithium zirconium silicates, lithium niobates, lithium borosilicates, lithium phosphosilicates, lithium nitrides, lithium aluminum fluoride, and mixtures thereof.

In accordance with another object of the present invention, a method has been discovered for preparing an ion conductor layer wherein the method comprises the following steps: a) depositing a first ion transport layer onto a substrate, b) depositing a buffer layer onto said first ion transport layer, and c) depositing a second ion transport layer onto said buffer layer. The method also contemplates that the ion conductor layer may be comprised of more than one buffer layer and more than two ion transport layers. Indeed, the ion conductor layer may be comprised of any number of buffer and ion transport layers provided that such layers meet the objectives of the present invention. As such, the method may also comprise the steps of depositing additional ion transport and buffer layers onto the second ion transport layer, wherein the additional ion transport and buffer layers alternate within the ion conductor layer.

In accordance with one embodiment of the method of the current invention, adjacent ones of the at least two ion transport layers and buffer layer are comprised of different materials.

In accordance with another embodiment of the method of the current invention, the ion transport layers are comprised of an insulator including, but not limited to, silicon oxides, aluminum oxides, aluminum nitrides, niobium oxides, tantalum oxides, titanium oxides, zirconium oxides, yttrium oxides, hafnium oxides, and mixtures thereof.

In accordance with another embodiment of the method of the current invention, the buffer layer is selected from the group consisting of transparent lithium ion permeable materials and mixed conductors. In some embodiments, the buffer layer may be selected from the group consisting of tungsten oxides, nickel oxides, cerium oxides, molybdenum oxides, vanadium oxides, and mixtures thereof. In other embodiments, the buffer layer may be selected from lithium-based ceramic materials.

In accordance with another embodiment of the method of the current invention, the ion transport layers and/or buffer layers may be independently deposited by means of a method selected from the group consisting of physical vapor deposition, intermediate frequency reactive sputtering, DC sputtering, wet chemical methods, laser ablation methods, sol-gel, metallo-organic decomposition, and magnetic sputtering.

Applicants have found that electrochromic devices utilizing the improved ion conductor layer as disclosed herein color more deeply by virtue of the increased voltage developed across the ion conductor prior to electronic breakdown. Applicants have also found that electrochromic devices utilizing the improved ion conductor layer as disclosed herein are less susceptible to electronic leakage. Applicants have also discovered that the improved ion conductor layer contained within an electrochromic device provides thermal stabilization properties to the electrochromic device, which are desirable for more robust manufacturing.

DETAILED DESCRIPTION

One object of the present invention is to provide an electrochromic device having an improved ion conductor layer. The improved ion conductor layer serves to block electron flow in both directions while permitting ionic conduction. The improved ion conductor layer also provides thermal stabilization properties, which are desirable for more robust processing. This and other objectives are realized by means of an electrochromic device utilizing a multi-layered thin film ion conductor comprised of thin films of at least two ion transport layers and a buffer layer, wherein the at least two ion transport layers and the buffer layer alternate within the ion conducting layer. Such a multilayered thin film ion conductor layer allows for devices to color more deeply by increasing the voltage developed across the ion conductor prior to electronic breakdown while reducing the amount of electronic leakage.

Another objective of the present invention is to provide an ion conductor layer which may be used in electrochromic devices and in other applications requiring ion conductor layers, such as batteries.

Yet another objective of the present invention is to provide a method of preparing an electrochromic device comprising an improved ion conducting layer.

Yet a further objective of the present invention is to provide a method of preparing an improved ion conducting layer for use in electrochromic devices and in other applications requiring ion conductor layers.

Figure 3A:
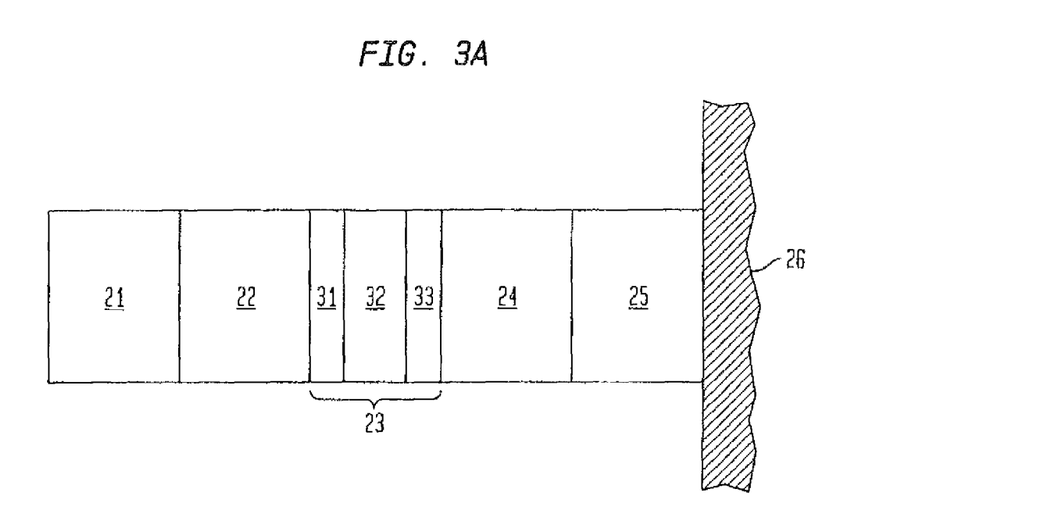
FIG. 3A is a schematic cross-section of a five layer electrochromic device having an improved ion conductor layer in accordance with one embodiment of the current invention.

In accordance with the present invention, FIG. 3A illustrates a solid-state electrochromic device, in cross-section, having an improved ion conductor layer. The device of FIG. 3A is similar to the solid-state device depicted in FIG. 1 to the extent that each of the aforementioned layers is present in the current invention. However, the ion conductor layer of the current invention is comprised of multiple layers, as described herein. Thus, the device of the present invention, has the following thin film layers: an electrochromic electrode layer ("EC") 24 acting as a first electrode which produces a change in absorption or reflection upon oxidation or reduction; an ion conductor layer ("IC") 23 comprised of alternating ion transport and buffer layers which functionally replaces an electrolyte allowing the passage of ions while blocking electronic charge; a counter electrode layer ("CE") 22 acting as a second electrode which serves as a storage layer for ions when the device is in the bleached state; and two conductive layers ("TC") 21 and 25 which serve to apply an electrical potential to the electrochromic device. Each of the aforementioned layers are typically applied sequentially on a substrate 26.

In operation, the electrochromic device of FIG. 3A is transformed from a substantially transparent state to a less transparent or dark state by application of a positive voltage to the conductive layer 21 relative to the other conductive layer 25. The applied voltage causes charge compensating ions, such as lithium, sodium, or hydrogen ions, to pass from the counter electrode layer 22 into the electrochromic electrode layer 24 via the ion conductor layer 23. Meanwhile, electrons are transported around the external circuit via the transparent conductors 21 and 25, and injected into the electrochromic electrode layer 24. The injected electrons yield a reversible electrochemical reduction of the material comprising the electrochromic electrode layer, resulting in reversible changes in the device's intrinsic optical properties, such as optical absorbance and the index of refraction. This overall reversible process is promoted by the simultaneous injection of charge compensating ions into the electrochromic electrode layer.

In order to reverse the process for transforming the electrochromic device from a relatively low level of light transmission to a relatively high level of light transmission, the polarity of the circuit is reversed by applying a positive voltage to the transparent conductor 25 relative to the transparent conductor 21. This causes charge compensating ions to flow out of the electrochromic electrode layer, back through the ion conductor layer 23, and into the counter electrode layer 22. Meanwhile, the polarity reversal causes electrons to flow out of the electrochromic electrode layer, around the external circuit, and into the counter electrode layer 22. This extraction of electrons yields a reversible electrochemical oxidation of the material comprising the electrochromic electrode layer, reversing the aforementioned changes in intrinsic optical properties.

Figure 3B:
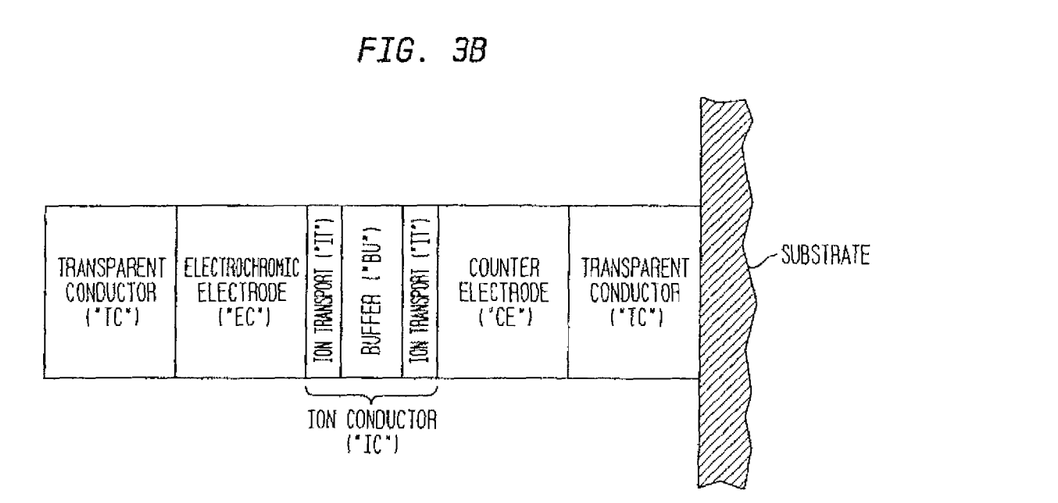
FIG. 3B is a schematic cross-section of a five layer electrochromic device having an improved ion conductor layer, wherein the counter electrode layer and the electrochromic electrode layer are reversed.

It will be appreciated that the counter electrode layer 22 and the electrochromic electrode layer 24 may be reversed in the overall structure of FIG. 3A. In such a reversed arrangement, as depicted in FIG. 3E, the counter electrode layer acts as the first electrode and the electrochromic electrode layer acts as the second electrode. However, if the counter electrode layer and the electrochromic electrode layer are reversed, the polarity of the applied potential must be adjusted to ensure that the correct polarity for the layers is maintained.

The ion conductor layer may be comprised of any number of ion transport and buffer layers provided that: (a) the ion transport and buffer layers alternate within the ion conductor layer; (b) the layer deposited immediately adjacent to the first deposited electrode, either the electrochromic electrode layer or the counter electrode layer, is an ion transport layer; and (c) the layer deposited immediately adjacent to the second deposited electrode, the other of the electrochromic electrode layer or the counter electrode layer, is an ion transport layer. In the specific embodiment depicted in FIG. 3A, the ion conductor layer is comprised of two ion transport layers 31 and 33, separated by a buffer layer 32, wherein the ion transport layers 31 and 33 are in communication with a counter electrode layer 22 and an electrochromic electrode layer 24, respectively. In one preferred embodiment, the ion conductor layer is comprised of two ion transport layers and one buffer layer. In another preferred embodiment, the ion conductor layer is comprised of three ion transport layers and two buffer layers. In yet another preferred embodiment, the ion conductor layer is comprised of four ion transport layers and three buffer layers.

Any two adjacent ion transport and buffer layers comprising the ion conductor layer are comprised of different materials. For example, in FIG. 3A the ion transport layer 31 may be comprised of silicon dioxide, the buffer layer 32 may be comprised of tungsten oxide, and the ion transport layer 33 may be comprised of silicon dioxide. Thus, at each ion transport and buffer layer interface, a heterogeneous junction ("heterojunction") is formed. As defined herein, a "heterojunction", is an electronic barrier resulting from the difference in bandgap energies of the dissimilar materials constituting adjacent layers. As such, electronic conductivity is blocked in a direction perpendicular to the layers by virtue of this electronic bandgap difference. A heterojunction is formed at each ion transport and buffer layer interface or each buffer layer and ion transport interface comprising the ion conductor layer. Heterojunctions are also formed at the ion transport layer and first electrode interface and the ion transport layer and second electrode interface. It is believed that these heterojunctions provide for the enhanced electron blocking of the current invention.

The materials comprising the ion transport layers are selected from insulators. When used in window applications, such as architectural windows, it is preferred that the ion conductor be selected from a transparent insulator. As used herein, "transparent" means that a significant percentage of incident light intensity may be transmitted through a thin film over a wide angular range of incidence. The percentage of transmission of incident light intensity may range from less than about 20% transmittance to greater than about 80% transmittance, depending on the specific application, with the non-transmitted light intensity lost to physical processes including optical absorption, light scattering, and optical reflection. The magnitude of light intensity loss depends upon both the thickness of the insulator material and the insulator material's intrinsic optical properties, including optical absorptivity, the concentration of light absorbing species, the concentration and cross section of light scattering centers, and the refractive index with respect to adjoining materials. It will be appreciated that both the thickness and intrinsic optical properties of the insulator material may be selected to suit certain applications. For example, in architectural window applications, the percent transmission needs to be optimized but not necessarily maximized. In this case, a significant loss of incident light intensity may be desired. On the other hand, in certain electronic display applications, the light scattering and optical absorption of the insulator material may both need to be maximized to provide a substantially opaque backdrop for the reversibly coloring electrochromic material. It can further be appreciated that the selection and combination of ion transport layers comprised of various insulator materials affords several optical degrees of freedom over which optical transmission, reflection and light scattering can be optimized.

According to the theory of band structure in solids, the insulators of the current invention are characterized by a full valence band separated from an empty conduction band by a few electron volts. As such, electronic conduction cannot take place in either the filled or empty bands unless additional carriers (i.e. electrons or holes) are introduced. However, the ionic conductivity of such insulator materials is unrelated to the band structure, depending instead on the physical structure of the material itself. In the case of an insulator sandwiched between two electrodes, and without wishing to be bound by any one particular theory, it is believed that the simplest electronic conduction mechanism is the direct quantum-mechanical tunneling of electrons or holes from a first to a second electrode. The carriers may also be injected into the conduction or valence band of the insulator by thermionic or Schottky emission over the metal-insulator interface barrier. Moreover, the carriers may tunnel through the insulator barrier gap at high fields (field or cold emission).

Transport of carriers in the conduction band, however, is modulated by scattering processes. While it is believed that lattice scattering is not expected to be significant for the thin layers of the current invention, it should be noted that less ordered films (such as amorphous films) contain a large number of traps. In the presence of such traps, conduction can also take place by tunneling between traps, or depending on the type of traps, by hopping from trap to trap (see Kasturi L. Chopra's *Thin Film Phenomena*, McGraw Hill: 1969, pages 479 and following, incorporated herein by reference).

Insulators which may be utilized as part of the current invention include, but are not limited to, silicon oxides, aluminum oxides, aluminum nitrides, niobium oxides, tantalum oxides, titanium oxides, zirconium oxides, yttrium oxides, hafnium oxides, and mixtures thereof. Specific insulators which may be utilized include, but are not limited to, $SiO_2$, $Al_2O_3$, $Nb_2O_3$, $Ta_2O_5$, $LiTaO_3$, $LiNbO_3$, $La_2TiO_7$, $La_2TiO_7$, $SrZrO_3$, $ZrO_2$, $Y_2O_3$, $Nb_2O_5$, $La_2Ti_2O_7$, $LaTiO_3$, $HfO_2$ and mixtures thereof. Specific mixtures which may be utilized include mixtures of $SiO_2$ and $Al_2O_3$ and mixtures of $ZrO_2$ and $Y_2O_3$. If a mixture of any two materials is utilized, the amount of the first material to the amount of the second material ranges from about 30:1 to 1:30, preferably from about 20:1 to about 1:20.

In some preferred embodiments of the present invention, the materials comprising the ion transport layers are selected from $SiO_2$, $Al_2O_3$, and $Nb_2O_3$.

In other preferred embodiments, the ion transport layer is a mixture of a silicon oxide and aluminum oxide, wherein the ratio of silicon oxide to aluminum oxide in such a mixture ranges from about 25:1 to about 1:25, preferably the ratio of silicon oxide to aluminum oxide ranges from about 11:1 to about 17:1.

One skilled in the art would appreciate that any of the materials selected for use in the ion transport layers may be mixed with one or more additives selected from metals, metal oxides, compounds containing metals, molecules, or atomic species to alter the chemical and/or physical properties of one or more ion transport layers.

In some embodiments, each ion transport layer comprising the ion conductor is comprised of the same material. In other embodiments, some of the ion transport layers comprising the ion conduction may be comprised of one type of material while other ion transport layers comprising the same ion conductor may be comprised of a different type of material. Indeed, it is possible for each of the ion transport layers comprising the ion conductor layer to be made from different materials.

The thickness of the ion transport layer varies depending on the material comprising the layer and the desired properties of the electrochromic device. However, the ion transport layer typically ranges from about 1 nm to about 70 nm in thickness, preferably from about 5 nm to about 30 nm in thickness. Each ion transport layer comprising the ion conductor layer may be about the same thickness or may be of varied thicknesses. It is preferred, however, that each of the ion transport layers be about the same thickness. Moreover, the ion transport layers may be of the same or different thicknesses as compared with the buffer layers.

Any material may be used as a buffer layer provided it allows for the passage of ions from one ion transport layer to another. In some embodiments, the material comprising the buffer layer has low or no electronic conductivity, but this is not essential. The buffer layers are selected from materials including transparent lithium ion permeable materials and mixed conductors. As used herein, a "mixed conductor" means an ion/electron conductor. In some embodiments, the buffer layer comprises metal oxides including, but not limited to, tungsten oxides, nickel oxides, cerium oxides, molybdenum oxides, vanadium oxides, and mixtures thereof. Specific buffer layer materials include, but are not limited to, $WO_3$, NiO, $CeO_2$, $MoO_3$, $V_2O_5$, and mixtures thereof. Specific mixtures which may be utilized include mixtures of NiO and $WO_3$, mixtures of $CeO_2$ and $MoO_3$, mixtures of $CeO_2$ and $V_2O_5$, mixtures of $MoO_3$ and $V_2O_5$, and mixtures of $CeO_2$, $MoO_3$, and $V_2O_5$. If a mixture of any two materials is utilized, the amount of the first material to the amount of the second material ranges from about 30:1 to about 1:30, preferably from about 20:1 to about 1:20.

In other embodiments, the buffer layer comprises a silica-based, an alumina-based, or an alumina-silica-based structure. Other buffer materials particularly adapted for lithium ion transmission are lithium-based ceramic materials including lithium silicates, lithium aluminum silicates, lithium aluminum borates, lithium borates, lithium silicon oxynitrides, lithium zirconium silicates, lithium niobates, lithium borosilicates, lithium phosphosilicates, lithium nitrides, lithium aluminum fluoride, and other lithium-based ceramic materials, silicas, or silicon oxides.

In preferred embodiments, the buffer layer is selected from the group consisting of tungsten oxide and mixtures of nickel oxide and tungsten oxide.

In some embodiments, each buffer layer comprising the ion conductor layer is comprised of the same material. In other embodiments, however, some of the buffer layers comprising the ion conductor layer may be comprised of one type of material while other buffer layers comprising the same ion conductor layer may be comprised of a different type of material. Indeed, it is possible for each of the buffer layers comprising the ion conductor to be made from different materials.

The thickness of the buffer layer varies depending on the material comprising the layer and the desired properties of the electrochromic electrode layer device. However, the buffer layer typically ranges from about 10 nm to about 300 nm in thickness, preferably from about 30 nm to about 150 nm in thickness. Each buffer layer comprising the ion conductor layer may be about the same thickness or may be of varied thicknesses. It is preferred, however, that the buffer layers be about the same thickness. Moreover, the buffer layers may be of the same or different thicknesses as compared with the ion transport layers.

In one preferred embodiment, the ion conductor layer is comprised of a silicon dioxide first ion transport layer, a tungsten oxide buffer layer, and a second silicon dioxide ion transport layer. In another preferred embodiment, the ion conductor layer is comprised of a silicon dioxide first ion transport layer, a niobium oxide buffer layer, and a silicon dioxide second ion transport layer. In yet another preferred embodiment, the ion conductor layer is comprised of a silicon oxide/aluminum oxide first ion transport layer, a tungsten oxide buffer layer, and a silicon oxide/aluminum oxide second ion transport layer. In yet a further preferred embodiment, the ion conductor layer is comprised of a silicon dioxide first ion transport layer, a tungsten oxide first buffer layer, a silicon dioxide second ion transport layer, a tungsten oxide second buffer layer, and a silicon dioxide third ion transport layer.

The overall thickness of the ion conductor layer depends upon how many ion transport and buffer layers comprise the ion conductor layer, the materials comprising each of those layers, and the thicknesses of each of those layers.

The electrochromic devices of the present invention comprise a counter electrode layer 22 in communication with one of the ion transport layers. The purpose of the counter electrode layer is primarily to "insert" and store the charge compensating ions, such as lithium, sodium, or hydrogen ions, when not employed in the electrochromic electrode layer. Some counterelectrode materials are also electrochromic in that they change their shade or transparency as ions move in or out. Such materials can complement the coloration of the electrochromic layer.

The counter electrode layer 22 is typically formed from a material which is capable of storing ions and then releasing these ions for transmission to the electrochromic electrode layer 24 in response to an appropriate electric potential. In some embodiments, the counter electrode layer is comprised of a metal oxide including the oxides of vanadium, niobium, nickel, iridium, cobalt, tungsten, tantalum and molybdenum. Preferred metal oxide materials for the counter electrode layer include vanadium pentoxide, niobium oxide, nickel oxide, nickel hydroxide, iridium oxide, cobalt oxide, molybdenum oxide, and mixtures (both intercalated and chemically combined forms) of these materials, such as chromium vanadium oxide, tungsten-nickel oxide, tantalum-nickel oxide and the like. In some embodiments, the counter electrode layer is comprised of a mixed metal oxide comprising a first transition metal oxide present as a stable metal oxide matrix and a second transition metal doped into the stable metal oxide matrix. The first transition metal is selected from chromium, tungsten, and tantalum. The second transition metal is selected from vanadium and nickel. The current invention also contemplates the lithium doped compounds of each of the aforementioned metal oxides.

The thickness of the counter electrode layer 22 varies depending on the application sought for the electrochromic device, the transmission range desired, and the material comprising the counter electrode layer. As such, the thickness may range from about 50 nm to about 650 nm. In one embodiment of the present invention, the thickness may range from about 150 nm to about 250 nm, preferably ranging from about 175 nm to about 205 nm in thickness.

The electrochromic devices of the present invention also comprise an electrochromic electrode layer 22 in communication with another of the ion transport layers. The materials constituting the electrochromic electrode layer 24 are well known in the art and include inorganic materials, organic materials, and/or composites of inorganic and organic electrochemically active materials such that the electrochromic electrode layer is capable of receiving ions transferred from the CE layer 22. Exemplary electrochemically active inorganic metal oxides include $WO_3$, $V_2O_5$, $MoO_3$, $Nb_2O_5$, $TiO_2$, $CuO$, $Ni_2O_3$, $Ir_2O_3$, $Cr_2O_3$, $CO_2O_3$, $Mn_2O_3$, mixed oxides (e.g W—Mo oxide, W—V oxide) and the like. Other materials which may be utilized in the electrochromic electrode layer of the current invention, include those enumerated in C. G. Granvist, *Handbook of Inorganic Electrochromic Materials*, 1995: Elsevier, incorporated herein by reference. One skilled in the art would recognize that each of the aforementioned metal oxides may be appropriately mixed with metals including lithium, sodium, potassium, molybdenum, vanadium, titanium, and/or other suitable metals, compounds, or molecules containing metals. In one preferred embodiment, the EC layer 24 is selected from tungsten oxide or tungsten oxide doped with another metal or metal containing molecule.

The thickness of the electrochromic electrode layer 24 varies depending on the electrochemically active material chosen. However, the EC layer 24 typically ranges from about 50 nm to about 550 nm in thickness, preferably from about 300 nm to about 450 nm.

The materials employed for the conductive layers 21 and are well known in the art. Exemplary conductive layer materials include coatings of indium oxide, indium tin oxide, doped indium oxide, tin oxide, doped tin oxide, zinc oxide, doped zinc oxide, ruthenium oxide, doped ruthenium oxide and the like, as well as all thin metallic coatings that are substantially transparent, comprised of metals including gold, silver, aluminum, nickel alloy, and the like. It is also possible to employ multiple layer coatings, such as those available from Pilkington under the trade name of TEC-Glass®, or those available from PPG Industries under the trade names SUNGATE® 300 and SUNGATE® 500. The conductive layers 21 and 25 may also be composite conductors prepared by placing highly conductive ceramic and metal wires or conductive layer patterns on one of the faces of the substrate and then over coating this with transparent conductive materials such as indium tin oxide or doped tin oxides. The conductive layers may be further treated with appropriate anti-reflective or protective oxide or nitride layers.

Preferably, the conductive layers utilized in the present invention are transparent layers of indium tin oxide.

In some embodiments, the material selected for use in conductive layer 25 is the same as the material selected for use in conductive layer 21. In other embodiments, the material selected for use in conductive layer 25 is different than the material selected for use in conductive layer 21.

Typically, the conductive layer 25 is disposed on a substrate 26 having suitable optical, electrical, thermal, and mechanical properties such as, for example, glass, plastic or mirror materials, as a coating having a thickness in the range of about 5 nm to about 10,000 nm, preferably in the range of about 10 nm to about 1,000 nm. However, any thickness of the conductive layer may be employed that provides adequate conductance for the electrochromic device and which does not appreciably interfere with the transmission of light where required. Moreover, conductive layer 21 is typically the final layer of the electrochromic device deposited on the counter electrode layer 22. Other passive layers used for improving optical properties, or providing moisture or scratch resistance may be deposited on top of the active layers. These conductive layers are connected to an electrical power source in a conventional manner.

Typically, the substrate 26 of the electrochromic device is comprised of transparent glass or plastic such as, for example, acrylic, polystyrene, polycarbonate, allyl diglycol carbonate, styrene acrylonitrile copolymer, poly(4-methyl-1-pentene), polyester, polyamide, etc. It is preferable for the transparent substrate 26 to be either clear or tinted soda lime glass, preferably float glass, in which case a sodium ion diffusion barrier is typically applied to the bare substrate before depositing any of the layers described above. The sodium diffusion barrier prevents sodium ions from migrating from the bulk of the glass substrate into the overlying films, especially the first conductive layer and the electrochromic layer, during thermal processing. If plastic is employed, it is preferably abrasion protected and barrier protected using a hard coat of, for example, a silica/silicone anti-abrasion coating, a diamond-like protection coating or the like, such as is known in the plastic glazing art. Generally, the substrates have a thickness in the range of about 0.01 mm to about 10 mm, and preferably in the range from about 0.1 mm to 5 mm. However, any substrate of any thickness which will provide a functioning electrochromic device may be employed.

One illustrative example of an electrochromic device employing two ion transport layers is: a bottom conductive layer, a tungsten oxide electrochromic electrode layer, a silicon oxide first ion transport layer, a tungsten oxide buffer layer, a second silicon oxide layer, a nickel oxide counter electrode layer, and a top conductive layer. Another example of an electrochromic device having two ion transport layers is: a bottom conductive layer, a tungsten oxide electrochromic electrode layer, a silicon oxide first ion transport layer, a niobium oxide buffer layer, a silicon oxide second ion transport layer, a nickel oxide counter electrode layer, and a top conductive layer. An example of an electrochromic device having three ion transport layers is: a bottom conductive layer, a tungsten oxide electrochromic electrode layer, a silicon oxide first ion transport layer, a tungsten oxide first buffer layer, a silicon oxide second ion transport layer, a tungsten oxide second buffer layer, a third silicon oxide ion transport layer, a nickel oxide counter electrode layer, and a top conductive layer.

The electrochromic device of the present invention may be powered with alternate electrical sources including solar cells, thermoelectric sources, wind generators, etc., to make them self-sustaining. These may be also coupled into charge storage devices such as batteries, re-chargeable batteries, capacitors or other means.

The electrochromic device of the present invention may also be used as filters in displays or monitors for reducing the ambient light intensity, e.g., sun glare, that is incident on the monitor or display surface. Thus, the device may be employed to enhance the image quality of displays and monitors, particularly in well lit conditions.

One skilled in the art would appreciate that the ion conductor layer as described herein may be used in any other application or electrochromic device where an ion conductor layer is needed, such as in batteries. That is, the ion conductor layer is not limited to use in the specific electrochromic device described herein.

Also provided is a method of fabricating an electrochromic device having an improved ion conductor layer as described herein. The sequence of deposition steps, the number of deposition layers, and the composition or type of layers which are deposited may be varied to achieve the desired results without departing from the teachings of the present invention.

Foremost, a bottom conductive layer is deposited on a substrate. The bottom conductive layer may be deposited by any techniques known in the art including wet chemical methods, chemical vapor deposition, or physical vapor deposition processes. In a preferred embodiment, the materials comprising a conductor layer are deposited via sputtering onto a transparent substrate to form a first transparent conductor layer.

A first electrode, either an electrochromic electrode layer or a counter electrode layer, is then deposited on the bottom transparent conductor layer through wet chemical methods, chemical vapor deposition, or physical vapor deposition. Preferred methods of deposition include sol-gel, spray pyrolysis, electrodeposition, metallo-organic decomposition, laser ablation, pulsed laser ablation, evaporation, e-beam assisted evaporation, sputtering, intermediate frequency reactive sputtering, RF sputtering, magnetic sputtering, DC sputtering, reactive DC magnetron sputtering and the like.

In preferred embodiments, the first electrode is deposited via intermediate frequency reactive sputtering or DC sputtering techniques. In some embodiments, the first electrode layer is deposited on a heated bottom transparent conductor layer.

The individual ion transport and buffer layers comprising the ion conductor layer are then sequentially deposited on the first deposited electrode. Any number of ion transport and buffer layers may be deposited on the electrochromic electrode layer provided that: a) the ion transport and buffer layers alternate within the ion conductor layer; b) the layer deposited immediately adjacent to the first deposited electrode, either the electrochromic electrode or the counter electrode, is an ion transport layer; and c) the layer deposited immediately adjacent to the second deposited electrode, the other of the electrochromic electrode or the counter electrode, is an ion transport layer. The ion transport and buffer layers may be comprised of the materials discussed herein. In preferred embodiments, adjacent ones of the ion transport layers and buffer layer are comprised of different materials.

Each ion transport layer and/or buffer layer may be deposited via the same deposition process or may be deposited via different processes. The individual ion transport and buffer layers may be sequentially deposited by wet chemical methods, chemical vapor deposition or physical vapor deposition. Such methods of deposition include sol-gel, metallo-organic decomposition, laser ablation, evaporation, e-beam assisted evaporation, sputtering, intermediate frequency reactive sputtering, RF sputtering, magnetic sputtering, DC sputtering, and the like.

In some preferred embodiments, the ion transport and buffer layers are each independently deposited by intermediate frequency reactive sputtering or DC sputtering techniques. In other preferred embodiments, the ion transport and buffer layers are each deposited by sol-gel thin film deposition techniques including dip coating, spin coating and spray coating. In yet other preferred embodiments, some of the ion transport layers or buffers are deposited by sputtering while other ion transport or buffer layers are deposited by sol-gel techniques. The procedures for depositing such layers by sputtering or sol-gel coating are known to those skilled in the art.

A second electrode, the other of the electrochromic electrode layer or the counter electrode layer, is then deposited on the bottom transparent conductor layer through wet chemical methods, chemical vapor deposition, or physical vapor deposition. Preferred methods of deposition include sol-gel techniques, spray pyrolysis, electrodeposition, metallo-organic decomposition, laser ablation, pulsed laser ablation, evaporation, e-beam assisted evaporation, sputtering, intermediate frequency reactive sputtering, RF sputtering, magnetic sputtering, DC sputtering, reactive DC magnetron sputtering and the like.

A second conductive layer 21 is deposited on the counter electrode layer 22 by methods well known in the art and as described above in the deposition of the first conductive layer 25.

Indeed, it is possible that all of the layers comprising the electrochromic device are deposited via magnetron sputter deposition in the same vacuum processing chamber so as to increase device fabrication manufacturability, meaning that the yields are likely to be improved as a result of reduced handling, and the throughput is also likely to be increased as a result of fewer processing steps. Moreover, depositing all of the layers in the same chamber would result in a reduction in the number of short circuits.

Finally, charge compensating ions such as protons (H+), lithium ions, or sodium ions, are intercalated into the electrochromic device. As used herein, the term "intercalation" means the reversible insertion of a molecule, atom or ion into the lattice of an electrochromic device layer. In preferred embodiments of the current invention, the charge compensating ion is lithium, wherein the lithium ions are deposited by magnetron sputter deposition of atomic lithium from a metallic sputter target into the device, under vacuum processing conditions.

Typically, the intercalation step occurs after the deposition of one or both of the electrode layers. However, the intercalation step may occur after the deposition of any layer of the electrochromic device.

The amount of charge compensating ion deposited is carefully controlled such that an amount of charge compensating ion is added that allows for the greatest transmission of light through the electrochromic device.

The device may optionally be heat treated by heating the electrochromic device. In some embodiments, the heat treatment process is carried out subsequent to fabrication of the device, i.e. after the electrochromic layers have been deposited and at least one of the electrochromic layer and/or counterelectrode layers has been reduced via intercalation of charge compensating ions, as discussed above. Carrying out the heat treatment process at this point improves the switching characteristics of the electrochromic devices. Moreover, it is believed that the heat treatment process improves the conductivity and transparency of the device, especially the transparent conductor layers. Further, it is believed that the improved ion conductor of the current invention acts as a thermal stabilization layer which helps stabilize the integrity of the interfaces during any heat treatment process.

The heat treatment process may occur in a vacuum, an inert atmosphere, or an atmospheric oven. The treatment itself typically occurs at temperatures ranging from about 40° C. to about 550° C., preferably ranging from about 200° C. to about 500° C. In some embodiments, the electrochromic device is placed in an oven at room temperature and then heat is applied. In other embodiments, the electrochromic device is placed in a pre-heated oven. The device may be heated for a time ranging from about 1 minute to about 120 minutes, preferably ranging from about 10 minutes to about 30 minutes. In some embodiments, the temperature is ramped as the heat treatment process progresses.

In other embodiments, the device can be heated prior to the deposition of the second transparent conductor. This method results in electrochromic device whose properties are similar to those discussed in the preceding embodiment, but allows for the heating to be done in the same process chamber as the deposition, resulting in improved process flow.

As already mentioned, the position of the counter electrode layer 22 and the electrochromic layer 24 may be reversed in the overall structure presented in FIG. 3. One skilled in the art would appreciate that should the layers be reversed, the method of manufacturing the device does not change with regard to the steps that must be performed to generate each layer.

One skilled in the art would also appreciate that the methods utilized above to create the improved ion conductor layer of the present invention may be used to develop an ion conductor for use in connection with any electrochromic device or any other application requiring ion conductor layers, such as batteries. That is, the methods used to develop the ion conductor layer are not limited to use in the specific electrochromic device discussed herein. Moreover, the method of making the improved ion conductor discussed above may also be used to deposit an improved ion conductor on any surface or substrate, including, but not limited to, electrodes or conductive thin films.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of making an ion conductor layer comprising the steps of:
   a) depositing a first ion transport layer directly onto a substrate, said first ion transport layer comprising a material selected from the group consisting of silicon oxides, aluminum oxides, aluminum nitrides, niobium oxides, tantalum oxides, zirconium oxides, yttrium oxides, hafnium oxides, and mixtures thereof;
   b) depositing a buffer layer directly onto said first ion transport layer; and
   c) depositing a second ion transport layer directly onto said buffer layer, said second ion transport layer comprising a material selected from the group consisting of silicon oxides, aluminum oxides, aluminum nitrides, niobium oxides, tantalum oxides, zirconium oxides, yttrium oxides, hafnium oxides, and mixtures thereof.

2. The method of claim 1, further comprising the steps of depositing additional ion transport and buffer layers onto said second ion transport layer, wherein said additional ion transport and buffer layers alternate within said ion conductor layer.

3. The method of claim 1 or 2, wherein adjacent ones of said first and second ion transport layers and said buffer layer are comprised of different materials.

4. The method of claim 3, wherein said buffer layer is comprised of a material selected from the group consisting of transparent lithium ion permeable materials and mixed conductors.

5. The method of claim 3, wherein said buffer layer is comprised of a lithium-based ceramic material.

6. The method of claim 5, wherein said lithium-based ceramic material is selected from the group consisting of lithium silicates, lithium aluminum silicates, lithium aluminum borates, lithium borates, lithium silicon oxynitrides, lithium zirconium silicates, lithium niobates, lithium borosilicates, lithium phosphosilicates, lithium nitrides and lithium aluminum fluoride.

7. The method of claim 3, wherein said buffer layer is comprised of a material selected from the group consisting of nickel oxide, cerium oxide, molybdenum oxide, vanadium oxide, and mixtures thereof.

8. The method of claim 1 or 2, comprising depositing said first and second ion transport layers by means of a method selected from the group consisting of physical vapor deposition, intermediate frequency reactive sputtering, DC sputtering, wet chemical methods, laser ablation methods, sol-gel, metallo-organic decomposition, and magnetic sputtering.

9. The method of claim 1 or 2, comprising depositing said buffer layer by means of a method selected from the group consisting of physical vapor deposition, intermediate frequency reactive sputtering, DC sputtering, wet chemical methods, laser ablation methods, sol-gel, metallo-organic decomposition, and magnetic sputtering.

10. A method of making an ion conductor layer comprising the steps of:
    a) depositing a first ion transport layer directly onto a substrate;
    b) depositing a buffer layer directly onto said first ion transport layer; and
    c) depositing a second ion transport layer directly onto said buffer layer; and
    wherein said first and second ion transport layers are deposited by means of a method selected from the group consisting of physical vapor deposition, intermediate frequency reactive sputtering, DC sputtering, wet chemical methods, laser ablation methods, sol-gel, metallo-organic decomposition, and magnetic sputtering; and
    wherein said buffer layer is deposited by means of a method selected from the group consisting of physical vapor deposition, intermediate frequency reactive sputtering, DC sputtering, sol-gel, metallo-organic decomposition, and magnetic sputtering.

11. The method of claim 10, further comprising the steps of depositing additional ion transport and buffer layers onto said second ion transport layer, wherein said additional ion transport and buffer layers alternate within said ion conductor layer.

12. The method of claim 10, wherein adjacent ones of said first and second ion transport layers and said buffer layer are comprised of different materials.

13. The method of claim 12, wherein said first and second ion transport layers are comprised of an insulator.

14. The method of claim 13, wherein said insulator is selected from the group consisting of silicon oxides, aluminum oxides, aluminum nitrides, niobium oxides, tantalum oxides, titanium oxides, zirconium oxides, yttrium oxides, hafnium oxides, and mixtures thereof.

15. The method of claim 12, wherein said buffer layer is comprised of a material selected from the group consisting of transparent lithium ion permeable materials and mixed conductors.

16. The method of claim 12, wherein said buffer layer is comprised of a lithium-based ceramic material.

* * * * *